(12) United States Patent
Podoll et al.

(10) Patent No.: US 7,980,484 B1
(45) Date of Patent: Jul. 19, 2011

(54) AUTOMATIC FLOW GAP ADJUSTING ANTI-SLAB METHOD AND APPARATUS

(75) Inventors: Michael J. Podoll, Marion, IA (US); Bruce Penning, Palo, IA (US); David P. Beck, Cedar Rapids, IA (US)

(73) Assignee: Highway Equipment Company, Cedar Rapids, IA (US)

( * ) Notice: Subject to any disclaimer, the term of this patent is extended or adjusted under 35 U.S.C. 154(b) by 269 days.

(21) Appl. No.: 12/426,691

(22) Filed: Apr. 20, 2009

Related U.S. Application Data

(60) Provisional application No. 61/046,638, filed on Apr. 21, 2008.

(51) Int. Cl.
B05B 17/04 (2006.01)

(52) U.S. Cl. ............ 239/4; 239/659; 239/671; 239/672; 239/676; 239/683; 222/196; 222/625

(58) Field of Classification Search .................. 239/676, 239/659, 660, 683, 672, 671, 663, 4; 222/196, 222/610, 622, 624, 625, 415
See application file for complete search history.

(56) References Cited

U.S. PATENT DOCUMENTS

| | | |
|---|---|---|
| 788,429 A | 4/1905 | Ruf |
| 1,830,499 A | 11/1931 | Work |
| 3,097,851 A | 7/1963 | Cohrs |
| 3,167,319 A | 1/1965 | Kerr |
| 3,606,964 A | 9/1971 | Ensinger |
| 3,610,414 A | 10/1971 | Zumalt |
| 3,618,824 A | 11/1971 | Seymour |
| 3,633,796 A | 1/1972 | Zweegers |
| 3,659,753 A | 5/1972 | Jager |
| 3,703,260 A | 11/1972 | Grabske |
| 3,790,090 A | 2/1974 | Lorenc et al. |
| 3,820,914 A | 6/1974 | Zimmerman |
| 3,926,377 A | 12/1975 | Johnson |
| 3,931,934 A | 1/1976 | Smith |
| 3,948,443 A | 4/1976 | Omdal |
| 3,972,501 A | 8/1976 | Plough |
| 4,022,386 A | 5/1977 | Caye |
| 4,121,733 A | 10/1978 | Mcroskey |
| 4,162,766 A | 7/1979 | Ten Broeck |
| 4,212,428 A | 7/1980 | Walker |

(Continued)

FOREIGN PATENT DOCUMENTS

DE 2818227 A1 11/1979

(Continued)

OTHER PUBLICATIONS

Imeche Seminar Publication, 1999, No. 4, p. 11-18, Bury St. Edmunds, Professional Engineering Publishing, 1999.

*Primary Examiner* — Dinh Q Nguyen
*Assistant Examiner* — Jennifer Gordon
(74) *Attorney, Agent, or Firm* — Simmons Perrine Moyer Bergman PLC

(57) ABSTRACT

An anti-slabbing device pivotally coupled above a material conveyor and configured to drop down onto material conveyed and further configured so as to vibrate the leading edge of the material as it reaches the end of the conveyor to create a more consistent flow of material from the end of the conveyor down onto a spinner for distributing the material.

18 Claims, 5 Drawing Sheets

U.S. PATENT DOCUMENTS

| | | | |
|---|---|---|---|
| 4,362,272 A | 12/1982 | Martin | |
| 4,363,447 A | 12/1982 | Schulze | |
| 4,382,568 A | 5/1983 | Schertz | |
| 4,384,952 A | 5/1983 | Parsons | |
| 4,387,855 A | 6/1983 | Nielsen | |
| 4,398,578 A | 8/1983 | Walters | |
| 4,475,671 A * | 10/1984 | McCorkel | 222/196 |
| 4,484,852 A | 11/1984 | Anderson | |
| 4,493,585 A | 1/1985 | Axer | |
| 4,498,635 A | 2/1985 | Fielding | |
| 4,555,061 A | 11/1985 | Linde | |
| 4,561,818 A | 12/1985 | Capps | |
| 4,597,532 A | 7/1986 | Linde | |
| 4,598,868 A | 7/1986 | Asaoka | |
| 4,637,406 A | 1/1987 | Guinn | |
| 4,676,711 A | 6/1987 | Burgess, Jr. et al. | |
| 4,710,054 A | 12/1987 | Allen | |
| 4,765,772 A | 8/1988 | Benedetti | |
| 4,804,145 A | 2/1989 | Seymour | |
| 4,822,210 A | 4/1989 | Oury | |
| 4,907,720 A | 3/1990 | Henson | |
| 4,913,679 A | 4/1990 | Bender | |
| 4,936,489 A | 6/1990 | Blain | |
| 5,042,178 A | 8/1991 | Dutra | |
| 5,234,128 A | 8/1993 | Hill | |
| 5,242,120 A | 9/1993 | Barber | |
| 5,343,641 A | 9/1994 | Gregory | |
| 5,421,379 A | 6/1995 | Geiser | |
| 5,477,307 A | 12/1995 | Bergen | |
| 5,485,962 A | 1/1996 | Moss | |
| 5,516,011 A | 5/1996 | Fielding | |
| 5,533,828 A | 7/1996 | Campbell | |
| 5,699,724 A | 12/1997 | Wettstein | |
| 5,755,387 A | 5/1998 | Hedrick | |
| 5,832,638 A | 11/1998 | Watts | |
| 5,842,649 A | 12/1998 | Beck | |
| 5,988,535 A | 11/1999 | Kime | |
| 6,012,656 A | 1/2000 | Anderson | |
| 6,024,304 A | 2/2000 | Sawada | |
| 6,027,053 A | 2/2000 | Anderson | |
| 6,048,571 A | 4/2000 | Kohno | |
| 6,183,159 B1 | 2/2001 | Hashimoto et al. | |
| 6,202,944 B1 | 3/2001 | Mccrory | |
| 6,220,532 B1 | 4/2001 | Manon | |
| 6,393,720 B1 | 5/2002 | Clark | |
| 6,533,198 B1 * | 3/2003 | Podevels et al. | 239/676 |
| 6,554,701 B1 * | 4/2003 | Wolters | 460/101 |
| 6,817,552 B2 | 11/2004 | Kinkead | |
| 6,905,077 B2 | 6/2005 | Hoyle | |
| 6,932,286 B2 | 8/2005 | Smith | |
| 6,953,163 B2 | 10/2005 | Truan | |
| 7,045,167 B2 | 5/2006 | Maytum | |
| 7,104,478 B2 | 9/2006 | Niemela et al. | |
| 7,191,965 B2 | 3/2007 | Neier | |
| 2001/0010205 A1 | 8/2001 | Rodenberger | |
| 2003/0095836 A1 | 5/2003 | Hesse | |
| 2003/0168522 A1 | 9/2003 | Kost | |
| 2004/0060511 A1 | 4/2004 | Maytum | |
| 2004/0092298 A1 | 5/2004 | Holmen | |
| 2004/0137974 A1 | 7/2004 | Weichholdt | |
| 2004/0176151 A1 | 9/2004 | Gryspeerdt | |
| 2005/0101363 A1 | 5/2005 | Farley | |
| 2006/0255189 A1 * | 11/2006 | Niemela et al. | 239/672 |
| 2007/0069044 A1 | 3/2007 | Sandler | |

FOREIGN PATENT DOCUMENTS

| | | |
|---|---|---|
| DE | 3903152 A1 | 8/1989 |
| DE | 19616659 A1 | 2/1997 |
| EP | 829194 B1 | 11/2001 |
| EP | 1285998 A1 | 2/2003 |
| GB | 254567 A | 7/1926 |
| GB | 292310 A | 6/1928 |
| GB | 419014 A | 11/1934 |
| GB | 607554 | 9/1948 |
| GB | 763985 A | 12/1956 |
| GB | 818200 A | 8/1959 |
| GB | 858413 A | 1/1961 |
| GB | 937356 A | 9/1963 |
| GB | 977775 A | 12/1964 |
| GB | 1184999 A | 3/1970 |
| GB | 2120914 | 12/1983 |
| JP | 6158627 A | 6/1994 |
| JP | 2006006109 A | 1/2006 |
| JP | 2006246725 A | 9/2006 |
| WO | WO9614472 A1 | 5/1996 |
| WO | WO9737083 A1 | 10/1997 |
| WO | WO2004031486 A1 | 4/2004 |
| WO | WO2004049779 A1 | 6/2004 |

* cited by examiner

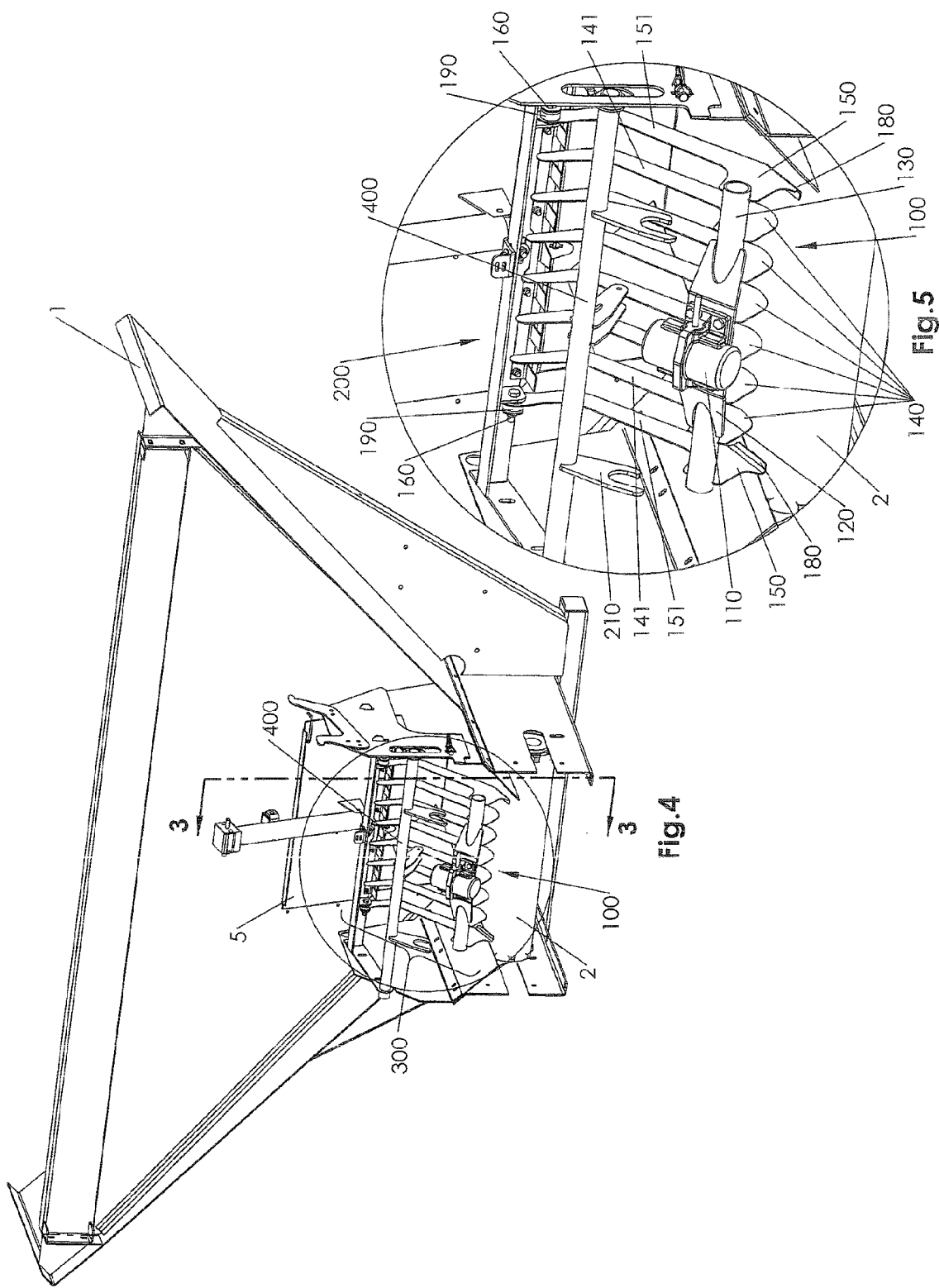

AUTOMATIC FLOW GAP ADJUSTING ANTI-SLAB METHOD AND APPARATUS

CROSS REFERENCE TO RELATED APPLICATIONS

This application claims the benefit of a provisional patent application entitled ANTI-SLAB DEVICE filed by Michael Podoll et al. on Apr. 21, 2008, and having a Ser. No. 61/046,638, which application is hereby incorporated herein in its entirety by this reference.

BACKGROUND OF INVENTION

Spinner spreaders for particulate materials are well known for agricultural and road maintenance applications. Many of the materials to be spread are not always free flowing, such as quarried agricultural lime or sand and salt for winter road maintenance. These materials consist of varying particle sizes and shapes that cause the material particles to interlock. The flow characteristics of these materials are also affected by the handling and storing of the material to be spread. As an example, agricultural lime and sand mixtures for road maintenance applications are stored outdoors and subject to moisture. The moisture adds to material cohesion, changes the natural angle of repose and the spatula angle, and further degrades the flow characteristics.

Materials to be spread are typically deposited on the spinner from a material storage bin via a belt conveyor or drag conveyor. As the material falls from the conveyor to the spinner, its flow is discontinuous because the particles adhere together and fall in slabs or blocks. The phenomena are much like those noted in avalanche studies and landslides where material adheres together and falls suddenly in slumps, blocks, and slabs. The result is inconsistent flow to the spinner. With certain materials and under certain conditions of the material and the application such as slow conveying speeds, material flow to the spinner may at times cease and, when weight of the material overcomes the adhesion or shear strength, the material will fall off the conveyor in large slabs. This changing flow does not permit accurate, consistent and even spreading and also may cause stress on the spreader's hydraulics and/or mechanical systems.

Modern variable rate technology for agricultural spreaders requires that the conveyor adjust its speed to match the needs of predetermined nutrient prescriptions. The requirements for material can vary greatly between prescription grids, and conveyor speeds must adjust accordingly to meter the material. Slow conveyor speeds make the slabbing of material more prevalent and result in loss of precision application.

Prior art in spreaders include hanging chains in the material path at the end of the discharge conveyor and attempt to use the motion of the vehicle to keep material from falling in slabs. This has proven to be inconsistent and not useful for the range of materials to be spread.

Other prior art exists where a reel or flail spins and keeps the material flowing. This art may produce a consistent flow, but the speeds of these devices can cause material to be thrown about and not placed accurately on the spinner. As noted in Rissi U.S. Pat. No. 6,517,281, the accurate placement of material on the spinner of precision spreaders is crucial to the spread pattern. This type of device can also be damaged if foreign debris is mixed in with the material to be spread.

European Patent Application EP1285998 A1 teaches a linear reciprocating device with a frequency of 30 to 130 strokes per minute, a stroke that exceeds the pitch of loosening protrusions, and loosening protrusions that are fixed across the material flow. This device can snag loose debris or block an object that is too large to pass the loosening protrusions which in turn could prevent consistent flow of material. Large objects such as rocks or frozen chunks of material may also damage the device itself. Because the protrusions are frequently in the material path (especially at high conveyor speeds), they can also impede the flow of large quantities of conveyed materials.

Prior art in industrial conveying applications may vibrate the conveyor itself to get material to flow smoothly off the conveyor end. Any vibrators attached to the discharge end of the conveyor could also tend to compact the material in the hopper. Vibrators attached directly to conveyors or bin walls also may tend to fatigue the structure they are attached to and cause equipment failures.

Therefore, limitations of prior art often do not achieve the results needed for today's precision spreading.

SUMMARY OF THE INVENTION

An objective of this invention is the provision of an improved method of delivering smooth, consistent flow of material from a conveyor system.

Another objective of this invention is the provision of an improved method of delivering smooth, consistent flow of material from a conveyor system to allow precision spreading of agricultural or de-icing materials.

Another objective is a provision of an anti-slabbing device that interacts with the shear or avalanche zone of the material at the end of the discharge conveyor.

Another object of the device is to remove any avalanche potential of material remaining on the conveyor after the conveyor ceases movement.

Another objective is a provision of a simple, low power, compact device that keeps material flowing from a conveyor in a consistent fashion suitable for installation on a land application or roadway spreader.

Another objective is a provision of a device that can help deliver consistent flow from a discharge conveyor where the device is not attached to the discharge conveyor system and will not apply undue stress to conveyor components.

Another objective is a provision of a device that can move out of the way of large, solid objects that may be mixed with the conveyed material.

Another objective is to create a device shape in the area of material interaction where the shape will not snag foreign debris that may be mixed with the conveyed material.

Another objective is a provision of a device that can stow in such a manner that prevents the devices from interacting with free-flowing material.

Another objective is to loosen material and provide consistent material flow while reducing concern of bodily entanglement that may be typical of a positively driven device.

Accordingly, the present invention comprises:
a method of improving flow rate uniformity of material flowing to a spinner spreader with controlled capacity for impeding flow and a concomitant increased ease of passing debris which might otherwise interfere with uniformity of flow of the material, comprising the steps of:
providing a conveyor for transporting material outwardly from a storage container which is carried upon a wheeled vehicle;
conveying material by the conveyor;

providing a spinner, below the conveyor, configured for distributing the material after the material falls off an end of the conveyor;

allowing the material to drop from the conveyor onto the spinner where it is distributed;

providing a pivoting vibrator assembly, disposed at least in part above portions of the conveyor and in contact with the material, while the material is being conveyed by the conveyor;

causing the pivoting vibrator assembly to vibrate, and thereby increase a flow consistency of the material on to the spinner;

configuring the pivoting vibrator assembly for and allowing the pivoting vibrator assembly to automatically pivot upwardly, as a result of a change in matter coming in contact with the pivoting vibrator assembly, and thereby increasing a gap through which the matter can drop below the conveyor.

An apparatus for improving uniformity in spreading of material by improving uniformity of flow of matter off an end of a conveyor exiting from a material storage bin on a wheeled vehicle, comprising:

a conveyor sized, located and configured to move dry bulk material from a material storage bin on a wheeled vehicle;

a spinner disposed below the conveyor and configured to spread material falling from an end of the conveyor;

a mounting structure, disposed above the conveyor;

a pivoting vibrator assembly pivotally coupled to the mounting structure and gravitationally biased with respect to the mounting structure, so as to allow gravity to swing the pivoting vibrator assembly downwardly toward the conveyor and into contact with material being conveyed on the conveyor, and upwardly away from the conveyor when increased forces upon the pivoting vibrator assembly occur, which increased forces arise from impact between matter being conveyed by the conveyor and the pivoting vibrator assembly; and wherein the pivoting vibrator assembly comprises:

an array of a plurality of elongated rigid cutting blades; and a vibrator coupled to and vibrating the array.

An apparatus for improving uniformity in spreading of material by improving uniformity of flow of matter off an end of a conveyor exiting from a material storage bin on a wheeled vehicle, comprising:

a conveyor sized and located to move particulate matter from a bin on a vehicle;

a rotating member disposed below the conveyor and configured to spread particulate matter falling from an end of the conveyor;

a mounting structure, disposed above the conveyor;

a pivoting assembly coupled to the mounting structure and biased, so as to allow the pivoting assembly to fall downwardly toward the conveyor and into contact with material being conveyed by the conveyor, and upwardly away from the conveyor when increased forces upon the pivoting assembly occur, which increased forces arise from impact between matter being conveyed by the conveyor and the pivoting assembly; and wherein the pivoting assembly comprises:

an array of a plurality of elongated members; and a vibrator coupled to and vibrating the array.

BRIEF DESCRIPTIONS OF DRAWINGS

FIG. 4 is a perspective view of a portion of the present invention, including portions of the prior art system of FIG. 1 with a conveyor discharge area with an embodiment of the present invention attached.

FIG. 5 is a detailed perspective view of the encircled portion of FIG. 4.

DETAILED DESCRIPTION

Figure 1:
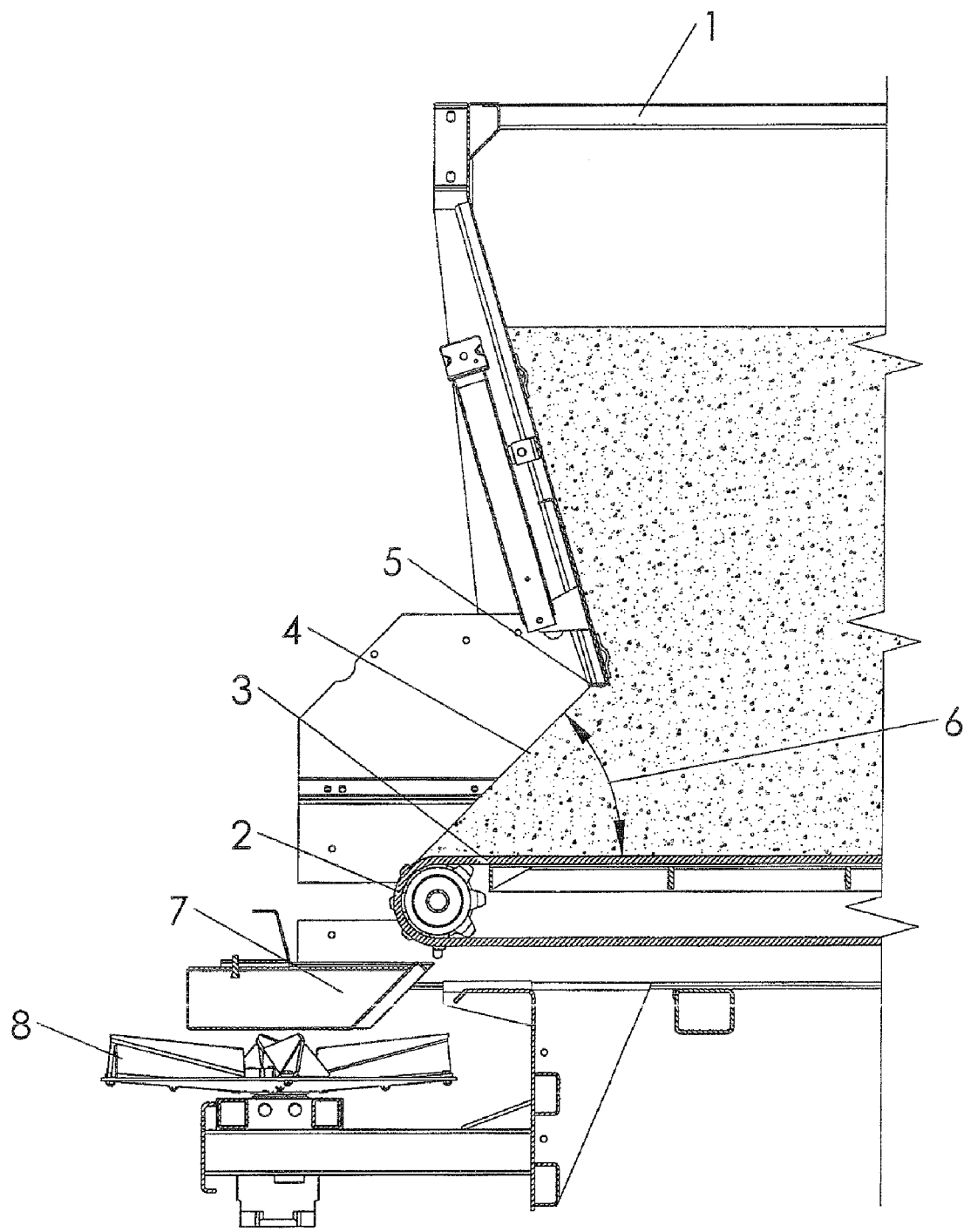
FIG. 1 shows a cross-sectional view of a prior art system for distributing matter.

Now referring to the drawings wherein like numerals refer to like matter throughout, and more particularly, FIG. 1 is a cross-sectional view of a prior discharge area of a material bin 1, conveyor end 2, conveyor 3, metered material 4, and metering gate 5 shown in an at rest state as if the conveyor 3 had ceased movement. When the metered material 4 on the conveyor 3 is a truly free-flowing material, it may exhibit a shallow angle of repose 6. As the conveyor 3 begins to move, free-flowing metered material 4 will fall off the conveyor end 2 with a nearly constant angle of repose 6, and the flow of material will be a continuous and constant rate. Below conveyor end 2 is a chute 7 which guides material to a one or more rotating spinner disks 8.

Figure 2D:
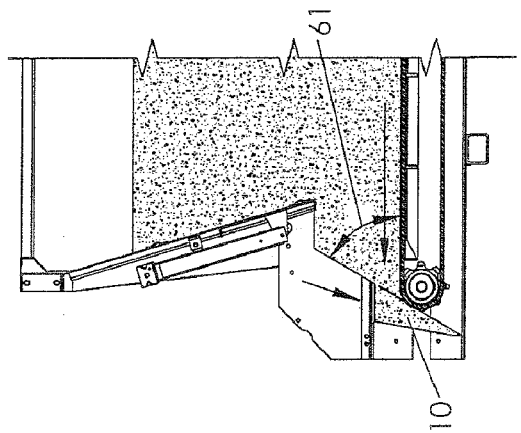
FIGS. 2A through 2D show sequenced cross-section views of the conveyor discharge area of the prior art system of FIG. 1 with inconsistent material flow.
Figure 2C:
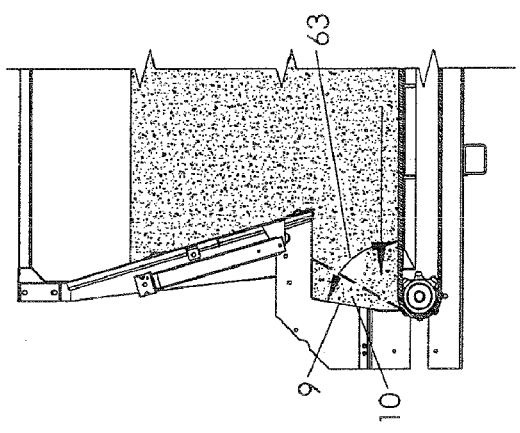
Figure 2B:
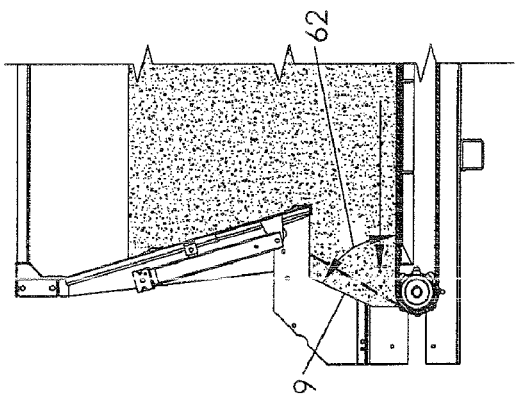
Figure 2A:
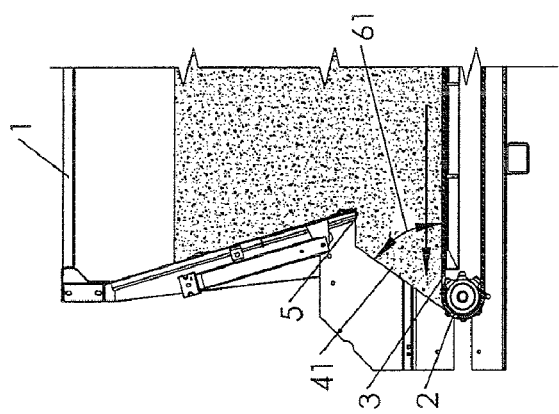

FIGS. 2A through 2D are cross-sectioned sequence views of a metered material 4 that is not completely free flowing. Referring specifically to FIG. 2A, the angle of repose 61 is determined by several factors, including, but not limited to friction, cohesion, shapes of particles, and density of the material 41. In FIG. 2B, as the base of the metered material stream drops from rotating conveyor end 2, the friction, cohesion, and shapes of particles holds the material 41 together, and the apparent angle of repose 62 becomes larger. As shown in FIG. 2C, the angle of repose 63 can grow larger until the leading surface 9 of the metered material 41 is nearly vertical. FIG. 2C shows the system immediately before the moment when the weight of material overcomes the forces holding the material 41 together. In FIG. 2D, it can be seen that a portion 10 of the metered material 41 will dislodge and fall together as a large mass in the form of a slump, block, or avalanche, leaving the material with an angle of repose 61. The process then repeats as shown from FIGS. 2A through 2D, and the result is a discontinuous or inconsistent flow of material. A spinner 8 (FIG. 1) or any other device positioned below the conveyor end 2 needing a consistent flow might not be able to perform its intended task.

Figure 3:
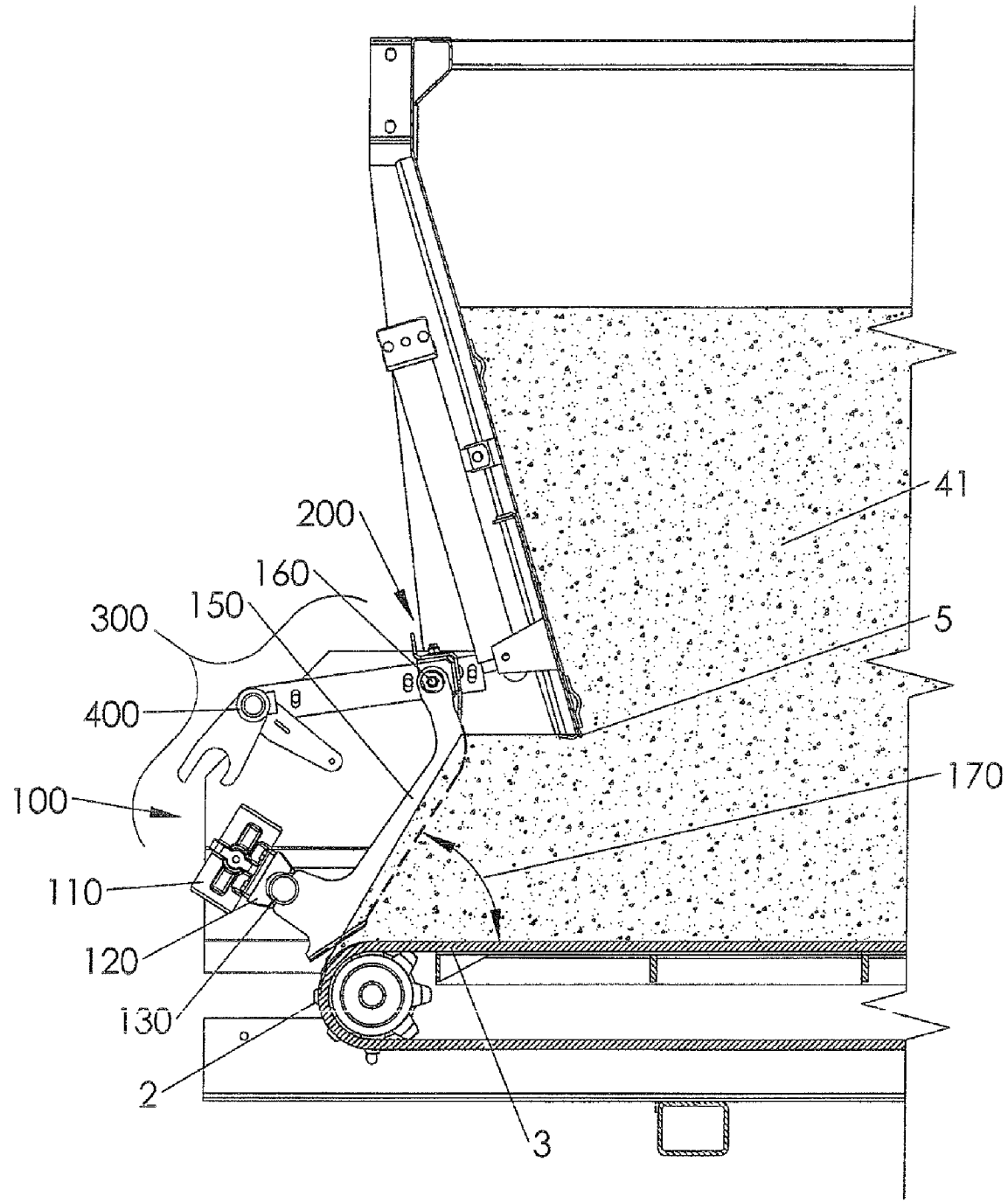
FIG. 3 shows a cross-sectional view taken on line 3-3 of FIG. 4 with the pivoting vibrator assembly in a deployed configuration, where the dashed lines refer to portions of the blade 150 which would otherwise be concealed inside the material.

FIGS. 3, 4 and 5 are, respectively, a cross-section view, a perspective view, and an enlarged perspective view of the present invention.

Now referring to FIGS. 3, 4 and 5, there is shown the anti-slab mechanism 300 of the present invention which comprises a pivoting vibrator assembly 100, a mounting structure assembly 200 and a latching mechanism 400.

Pivoting vibrator assembly 100 comprises a vibrator 110, which may be an electrical vibrator configured to operate at 1800 cycles per minute or even up to 4000 cycles per minute; the vibrator 110 may be attached to a mounting plate 120 and transverse member 130. The energy from the vibrator 110 is transferred through the mounting plate 120 to the transverse member 130 into a number of shaped blades 140 & 150 that are placed across the path of, and generally aligned with, the metered material 41 flow.

Outside blades 150 pivot so as to keep the cutting inner blades 140 in contact with the metered material 41 starting at a predetermined angle 170. If no material 41 is present, the outer blades 150 include a preferably non-abrasive flat surface 180 that rides on the conveyor 3 and prevents the cutting inner blades 140 from damaging the conveyor 3.

The pivots 160 about which the outside blades 150 pivot, include an isolator bushing 190 that prevents vibration and noise generation in the mounting structure 200.

The vibrator 110 is positioned to create an orbital motion perpendicular to the pivots 160. Vibrator 110 may be orbital and electric, hydraulic or pneumatic. The vibratory motion causes the blades 140 & 150 to both slice into the flow of metered material 41 and agitate the volume of material near the surface at the starting angle 170. This motion frees particles from locking friction and cohesion to create a material flow that is nearly free flowing.

Furthermore, the vibrator 110 is positioned so most of the energy is directed at the base of metered material 41 near the conveyor end 2. The portion of inner blades 140 farthest from the vibrator 110 are not retained and are free to vibrate along the length of the blade to free the material. The side surfaces 141 and 151 of the inner blades 140 and outer blades 150, respectively provide large contact action area to laterally interact with the material 41, thereby facilitating increased flow rate uniformity. The blades 140 and 150 are also stiff in the direction of material flow to cut into the surface of the material flow or provide strength required to pivot the pivoting vibrator assembly 100 away from large objects in the metered material 41 flow.

The shape and angle of the blades 140 and 150 are such that they agitate and create free flow for any setting of the meter gate 5 and metered material 41 depth on the conveyor 3. Furthermore, the vibrator 110 frequency setting, location, blade shapes, blade angles, pivots 160, and overall mass of the pivoting vibrator assembly 100 allow penetration into the upper layer of material an optimal amount. This optimal penetration or tuned working depth of the blades keeps the material flowing freely without impeding large material flows. In alternate embodiments, there may be means for biasing the flat surfaces 180 to the conveyor 3 which may include increased mass, via adding additional weights, or compressed springs or other suitable substitutes.

Figure 6:
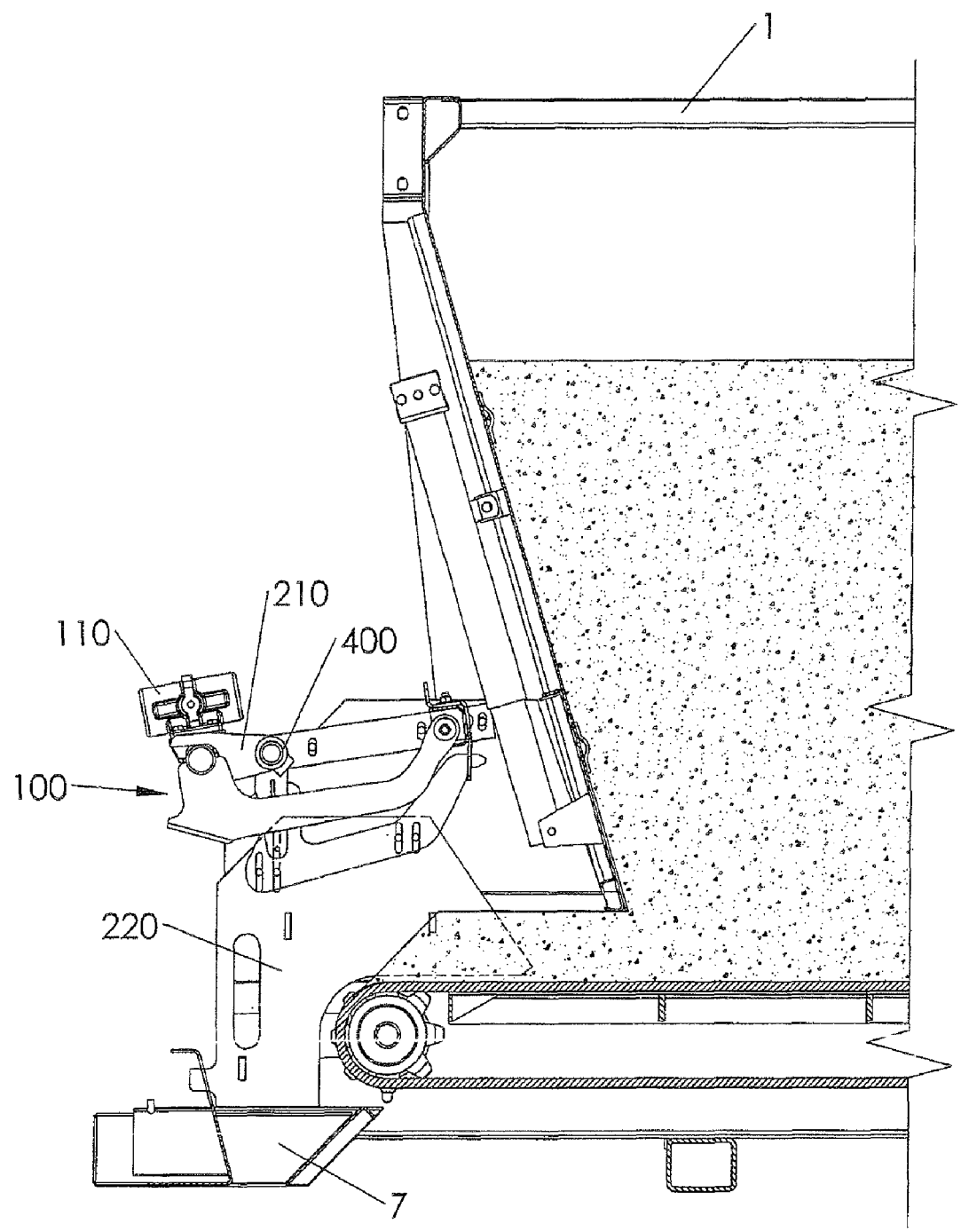
FIG. 6 is an alternate view of FIG. 3 except for the pivoting vibrator assembly is in a stowed configuration.

As the pivoting vibrator assembly 100 is mounted pivotably at the outer blades 150 end and can move out of the way of any solid foreign object that could be in the metered material 41 stream, likewise the pivoting vibrator assembly 100 can be pivoted completely out of the material path for storage when it is not needed as shown in FIG. 6.

The storage of the pivoting vibrator assembly 100 is accomplished by pivoting it away from the conveyor end 2 into the latching mechanism 400 which comprises an escapement 210 that can be locked into place. In the preferred embodiment of the invention, a hillside divider 220, which is often needed for free-flowing material, acts to lock the pivoting vibrator assembly 100 in the storage position. Pivoting vibrator assembly 100 also provides support for the hillside divider 220.

We claim:

1. A method of improving flow rate uniformity of material flowing to a spinner spreader with controlled capacity for impeding flow and a concomitant increased ease of passing debris which might otherwise interfere with uniformity of flow of the material, comprising the steps of: providing a conveyor for transporting material outwardly from a storage container which is carried upon a wheeled vehicle; conveying material by the conveyor; providing a spinner, below the conveyor, configured for distributing the material after the material falls off an end of the conveyor; allowing the material to drop from the conveyor onto the spinner where it is distributed; providing a pivoting vibrator assembly, disposed at least in part above portions of the conveyor and in contact with the material, while the material is being conveyed by the conveyor; causing the pivoting vibrator assembly to vibrate, and thereby increase a flow consistency of the material on to the spinner; configuring the pivoting vibrator assembly for and allowing the pivoting vibrator assembly to automatically pivot upwardly, as a result of a change in matter coming in contact with the pivoting vibrator assembly, and thereby increasing a gap through which the matter can drop below the conveyor; and wherein said pivoting vibrator assembly further comprises: a spaced apart array of a plurality of longitudinally rigid cutting inner blades, each inner blade comprising: a proximal end and an opposing distal end, where the proximal end is nearer an axis or rotation about which the pivoting vibrator assembly pivots and the distal end has a free end; a cutting edge, disposed between the proximal end and the distal end, for cutting into the material as it flows toward an end of the conveyor; a means for preventing the plurality of inner cutting blades from contacting a moving surface of the conveyor; and a vibrator coupled to and configured for vibrating the cutting inner blades at a predetermined vibrating frequency.

2. The method of claim 1 wherein the step of causing the pivoting vibrator assembly to vibrate comprises the step of causing the pivoting vibrator assembly to vibrate in a two-dimensional orbital manner.

3. The method of claim 1 wherein the change in matter coming in contact with the pivoting vibrator assembly is caused by an increase in at least one of feedgate opening size and speed of the conveyor.

4. The method of claim 1 wherein the change in matter coming in contact with the pivoting vibrator assembly is caused, at least in part, by debris disposed within the material being conveyed by the conveyor operating at a substantially constant speed.

5. The method of claim 1 wherein the predetermined vibrating frequency is in excess of 1000 cycles per minute.

6. The method of claim 1 further comprising the steps of:
providing a latching mechanism configured to hold the pivoting vibrator assembly in an upwardly disposed stowed configuration; and
stowing the pivoting vibrator assembly with the aid of the latching mechanism.

7. The method of claim 1 wherein the means for preventing further comprises:
a plurality of support blades each with a conveyor contacting surface, configured so as to contact the conveyor before any portion of the longitudinally rigid cutting inner blades would contact the conveyor and thereby prevent contact between a cutting edge and the conveyor.

8. An apparatus for improving uniformity in spreading of material by improving uniformity of flow of matter off an end of a conveyor exiting from a material storage bin on a wheeled vehicle, comprising: a conveyor sized, located and configured to move dry bulk material from a material storage bin on a wheeled vehicle; a spinner disposed below the conveyor and configured to spread material falling from an end of the conveyor; a mounting structure, disposed above the conveyor; a pivoting vibrator assembly pivotally coupled to the mounting structure and gravitationally biased with respect to the mounting structure, so as to allow gravity to swing the pivoting vibrator assembly downwardly toward the conveyor and into contact with material being conveyed on the conveyor, and upwardly away from the conveyor when increased forces upon the pivoting vibrator assembly occur, which increased forces arise from impact between matter being conveyed by the conveyor and the pivoting vibrator assembly; and wherein the pivoting vibrator assembly comprises: an array of a plurality of elongated rigid cutting blades; and a vibrator coupled to and vibrating the array; and wherein said array of a plurality of elongated rigid cutting blades comprises a plurality of outside blades configured to contact the conveyor and support a plurality of inner blades above a position of contacting the conveyor.

9. The apparatus of claim 8 further comprising:
releasable means for holding the pivoting vibrator assembly in an upwardly pivoted stowed position.

10. The apparatus of claim 8 wherein said vibrator is an electric vibrator.

11. The apparatus of claim 8 wherein the plurality of elongated rigid cutting blades interact with the material on the conveyor to create a forced angle of repose.

12. The apparatus of claim 11 wherein interaction between the plurality of elongated rigid cutting blades and the material on the conveyor is dependent upon a mass characteristic of the pivoting vibrator assembly.

13. An apparatus for improving uniformity in spreading of material by improving uniformity of flow of matter off an end of a conveyor exiting from a material storage bin on a wheeled vehicle, comprising:

a conveyor sized and located to move particulate matter from a bin on a vehicle;
a rotating member disposed below the conveyor and configured to spread particulate matter falling from an end of the conveyor;
a mounting structure, disposed above the conveyor;
a pivoting assembly coupled to the mounting structure and biased, so as to allow the pivoting assembly to fall downwardly toward the conveyor and into contact with material being conveyed by the conveyor, and upwardly away from the conveyor when increased forces upon the pivoting assembly occur, which increased forces arise from impact between matter being conveyed by the conveyor and the pivoting assembly; and
wherein the pivoting assembly comprises:
an array of a plurality of elongated members; and
a vibrator coupled to and vibrating the array.

14. The system of claim 13 wherein the vibrator is an electric vibrator.

15. The system of claim 13 wherein the vibrator is an orbital vibrator.

16. The system of claim 15 wherein said vibrator is an electric vibrator.

17. The system of claim 16 further comprising an electric control for controlling a vibrating frequency of the electric vibrator.

18. The system of claim 17 further comprising means for increasing pressure on the matter caused by the plurality of elongated members.

* * * * *